May 31, 1949.　　　　G. W. HARDY　　　　2,471,619
HYDRAULIC PRESSURE TRANSMITTER
Filed March 22, 1943　　　　　　　　　2 Sheets-Sheet 1

INVENTOR
GORDON W. HARDY
BY
George M. Soule
ATTORNEY

May 31, 1949.　　　　　G. W. HARDY　　　　　2,471,619
HYDRAULIC PRESSURE TRANSMITTER
Filed March 22, 1943　　　　　　　　　　　2 Sheets-Sheet 2
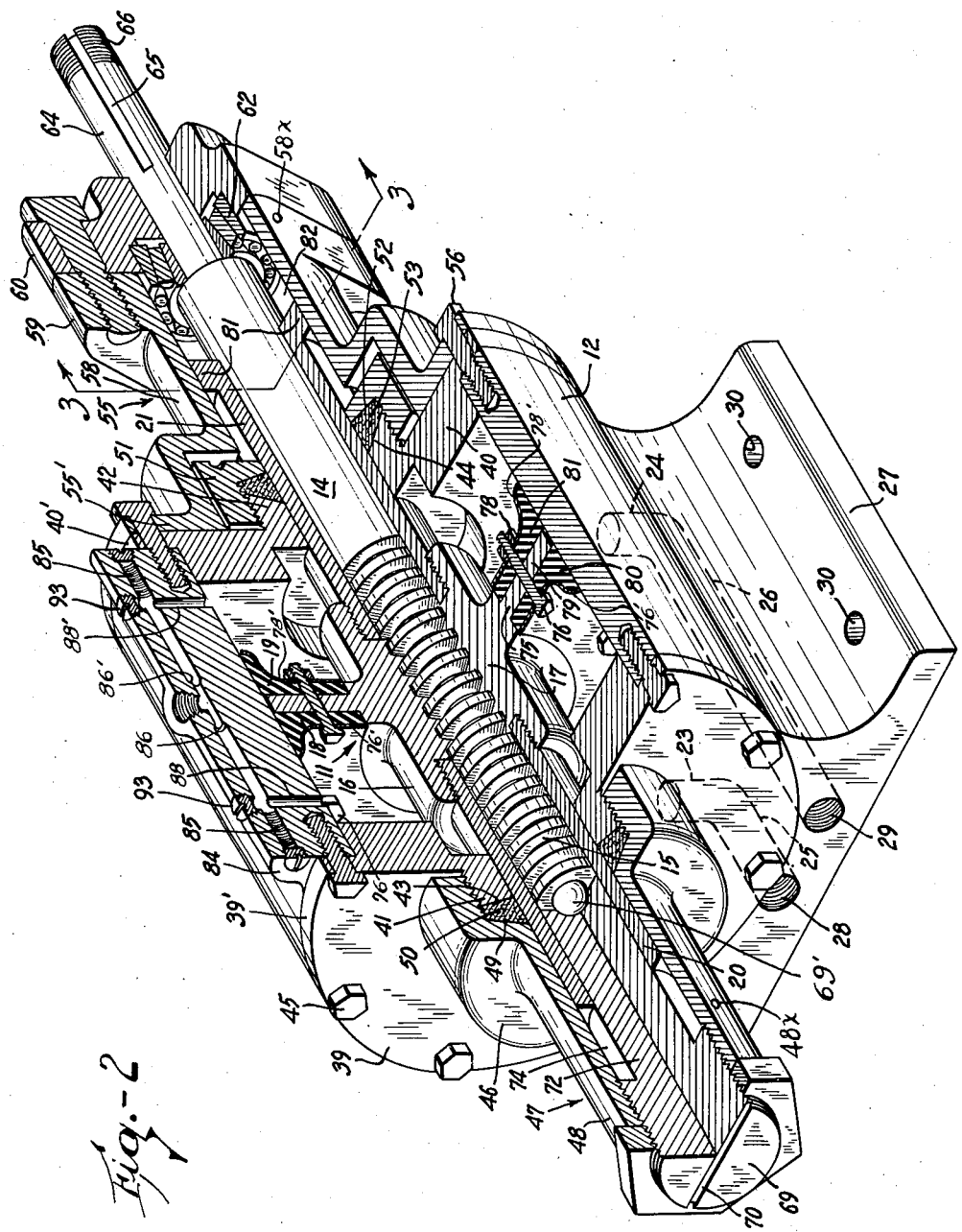
INVENTOR
GORDON W. HARDY
BY
George M. Soule
ATTORNEY Patented May 31, 1949

2,471,619

UNITED STATES PATENT OFFICE 2,471,619

HYDRAULIC PRESSURE TRANSMITTER

Gordon W. Hardy, Cleveland Heights, Ohio

Application March 22, 1943, Serial No. 480,023

5 Claims. (Cl. 60—54.6)

This invention relates to fluid pressure producing devices or hydraulic actuators, and more particularly to hydraulic actuators suitable for use in hydraulic motor transmitting systems such as are employed, for example, as part of the steering mechanism for marine craft, airplanes, and other vehicles.

Many types of primary fluid pressure producing devices or hydraulic actuators adapted to be used to impart motion to secondary hydraulically operable devices include a cylinder, a piston reciprocable in the cylinder, and a rotatable member passing through at least one wall of the cylinder for imparting motion to the piston as through a screw threaded connection with the piston. Since in such actuator devices high fluid pressure is produced alternately on opposite sides of the piston, difficulty has been experienced in adequately sealing the rotatable member against fluid leakage without introducing high friction forces tending to prevent free turning of the rotatable member, and tending to produce rapid deterioration of the sealing means. Also, difficulty has been experienced in such hydraulic actuators due to leakage of fluid from the system resulting in lost motion or "hydraulic backlash" notwithstanding the provision of reservoir supply means tending to compensate for such leakage.

In accordance with this invention an improved hydraulic actuator system is provided having means for insuring a continuous supply of fluid notwithstanding some leakage and which functions without loss of efficiency and prevents "hydraulic backlash," and in which fluid leakage around a rotatable screw shaft of the primary pressure producing means or actuator is prevented by means of an improved sealing arrangement which does not tend to bind the screw shaft against free turning and which is not subjected to the usual influences tending to wear the sealing material used therein.

The general object of this invention is to provide an improved fluid pressure producing device or hydraulic actuator.

Another object is to provide a hydraulic actuator and fluid source combination having improved means for preventing flow of fluid from the actuator to the source while permitting free flow of the fluid from the source to the actuator at all times.

A more specific object is to provide, in a hydraulic actuator including a cylinder having a port in its wall arranged to communicate with a fluid source, a simplified and readily adjustable means permitting unidirectional flow of fluid between the source and the cylinder.

A still more specific object is to provide a simplified valve assembly of the spring biased ball type between a fluid supply source and the cylinder of a hydraulic actuator.

A further object is to provide a hydraulic actuator including a screw or worm driven piston which has improved means for sealing the rotatable screw or worm shaft against fluid leakage.

A still further object is to provide means for eliminating the necessity for packing between a rotatable screw shaft and the cylinder wall of a hydraulic actuator through which the shaft passes.

Another specific object is to provide, on a piston which is reciprocated by a rotatable screw shaft, an elongated sleeve extension which surrounds and is reciprocable axially with respect to the rotatable screw shaft and thereby eliminate the necessity for providing packing in contact with the shaft to prevent fluid leakage around the shaft at the point where it enters the cylinder in which the piston reciprocates.

Still another object is to provide an elongated sleeve extension on a screw driven piston which cooperates with the cylinder in which the piston moves to seal the rotatable screw shaft against fluid leakage and to prevent rotation of the piston.

Other objects and advantages of this invention will become apparent from the following description of a preferred form shown in the drawings, wherein:

Fig. 2 is a cut-away perspective view of the fluid pressure producing device;

Figure 1:
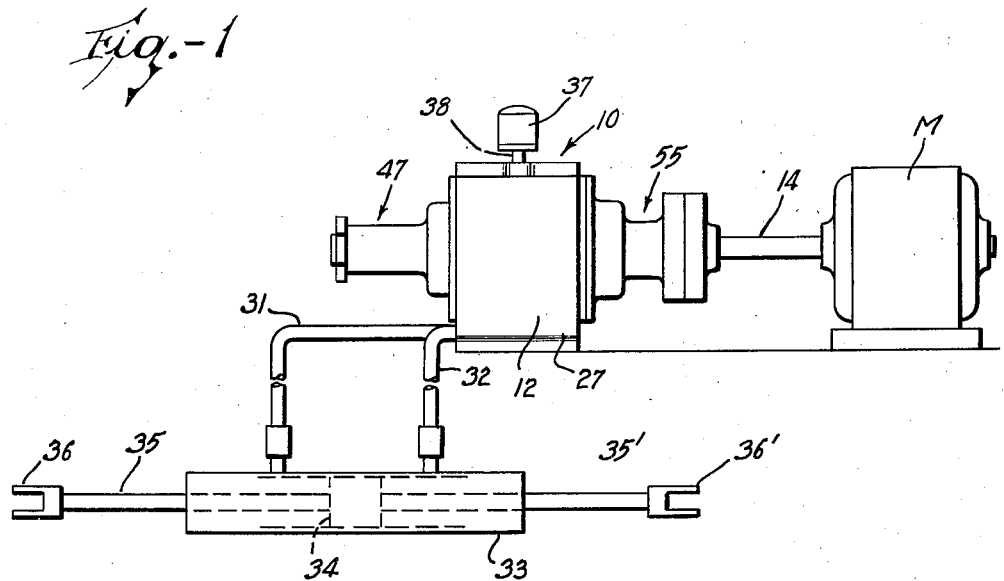
Fig. 1 is a simplified schematic view of a fluid pressure motion transmitting system in which the fluid pressure producing device of this invention may be used.

Referring to Figs. 1 and 2, the fluid pressure producing device 10 of this invention comprises generally a piston assembly 11 arranged to move within a cylinder 12 as a result of rotation of a screw shaft 14 having a coarse (e. g. square type) threaded portion 15 passing through a complementary threaded opening in a hub portion 16 of a traveling nut member 17 of the piston assembly 11. The screw shaft 14 may be driven manually through suitable gearing such as shown in my Patent 2,178,073, issued October 31, 1939, or by a prime mover such as a reversible electric motor M and control means therefor, not shown. The piston assembly 11, which will be described in detail hereinafter, comprises generally, in addition to the traveling nut member 17, annular elastic face members 18 and 19 which seal against the cylinder and tubular sleeve extensions 20 and 21.

The cylinder 12 is provided with outlet ports 23 and 24 in its wall near opposite ends and on opposite sides of the piston assembly 11 which communicate, through respective passages 25 and 26 in a base portion 27, with a pair of exterior outlet ports 28 and 29, respectively. Suitable openings 30 are provided in the base portion 27 for convenience in mounting the device 10.

Conduits 31 and 32 are threaded into the ports 28 and 29, respectively, and extend to a suitable fluid pressure translating device such as the secondary cylinder 33, the conduits being arranged, for example, to supply fluid respectively to opposite sides of a double-ended piston 34 slidable in the cylinder 33. The piston 34 has piston rods 35 and 35' extending through opposite ends of the secondary cylinder 33 which are provided at their outer ends with suitable couplings 36 and 36' respectively, by means of which the piston rods 35 and 35' may be readily attached to any desired mechanism, such as a boat steering mechanism, for accomplishing steering operations in accordance with the movements of the piston 34.

A fluid source 37 is arranged to maintain a supply of suitable hydraulic fluid, such as oil, to the cylinder 12 through a conduit 38 and passages, to be described later, in the top wall of the cylinder 12, the arrangement being such that the cylinder 12 and 33 and the interconnecting conduits 31 and 32 are automatically maintained full of fluid at all times.

As thus shown and described, rotation of the screw shaft 14 as by the motor M in a direction causing the piston assembly 11 to move to the right forces fluid from the right hand end of the cylinder 12 through the outlet port 24, the passage 26, and the conduit 32 to the right hand end of the secondary cylinder 33. This results in an increased fluid pressure in the right hand end of the cylinder 33, and, since movement of the piston assembly 11 to the right also reduces the fluid pressure in the left hand end of the cylinder 33 due to the interconnecting conduit 31, the piston 34 moves to the left under the joint additive influence of a positive pressure force and a negative or suction force to actuate the mechanism attached to the piston rods 35 and 35'. Obviously, rotation of the screw shaft 14 in the opposite direction so as to move the piston assembly 11 to the left causes the piston 34 to move to the right in a similar manner.

Referring more particularly to Fig. 2, the cylinder 12 is closed at its opposite ends by cylinder heads 39 and 40 having externally threaded tubular extensions 41 and 42, respectively, the openings through the extensions continuing through the heads and being enlarged at their inner ends to provide additional space for reciprocation of the piston assembly 11.

The head 39 may be attached to the cylinder 12 as by suitable cap screws 45 which pass through circumferentially spaced openings in an outer flange portion 39' of the head 39 into complementary threaded sockets in the cylinder 12; and an enlarged inner end 46 of a hollow axial bearing extension 47 is threaded over the extension 41. The hollow axial bearing extension 47 has an outer reduced tubular portion 48 and a generally concave area 49 on its inner wall surface at the intersection of the portions 46 and 48 which defines, with an end surface 43 of the extension 41, an annular generally V-shaped groove for receiving suitable packing 50. Similarly an annular skirted packing nut 51 is threaded on the extension 42 of the head 40 and has a generally concave area 52 which defines, with a corresponding area 44 of the extension 42, an annular generally V-shaped groove for receiving suitable packing 53.

An enlarged flanged tubular portion 54 of a bearing support 55 fits loosely over the packing nut 51 and has its flange 55' abutting the head 40. Suitable cap screws 56 pass through aligned spaced circumferential openings in the flange 55 and an outer flange portion 40' of the head 40 into complementary threaded sockets in the cylinder 12 to secure the head 40 and the hollow axial bearing extension 55 thereto. The bearing support 55 has a reduced central tubular portion 58 which merges into an outer portion 59 of generally ovate shape as shown, the openings through the tubular portion 58 continuing through the portion 59. Except for a small distance near the outer end, the inner wall of the tubular portion is splined (Fig. 3), for a purpose to be described later.

A thrust bearing plate 60 is secured to the portion 59 of the hollow axial bearing extension 55 as by a pair of cap screws 61, and has a central circular opening counterbored from its inner face to receive an anti-friction radial and axial thrust bearing assembly 62 (conical roller assembly as shown) for rotatably supporting the screw shaft 14 at a reduced outer end portion 64. The end portion 64 extends beyond the plate 60 and has a keyway 65 and a threaded portion 66 at its outer end for attachment of a suitable coupling associated with the motor M or other driving means for the shaft 14.

An enlarged inner portion 68 of the shaft 14 defines with the portion 64 a shoulder which may operatively abut against the bearing assembly 62 and has the screw threaded portion 15 near its inner end which engages with the traveling screw threaded nut member 17 of the piston assembly 11. The inner end face of the shaft 14 operatively abuts against the inner end face of a thrust shaft 69 which is threaded into the hollow axial bearing extension 47 and which is provided with a slot 70 in its outer end face so that it may be readily adjusted to determine the axial clearance of the shaft 14. To reduce friction, the inner end of the thrust shaft and adjacent end of the screw shaft may have a steel thrust ball 69' interposed therebetween in cupped ends of the two shafts complementary to the ball. A lock nut 71 holds the thrust shaft 69 in adjusted position. An inner non-threaded portion 72 of the shaft 69 is of lesser diameter than the inner diameter of the tubular portion 46 of the packing retainer 45 to define an annular space 74 into which the sleeve extension 20 is received.

The traveling nut member 17 of the piston assembly 11 has a flange 75 intermediate of its hub portion 16 which flange preferably has a diameter just slightly less than the internal diameter of the cylinder 12. The annular elastic piston sealing face members 18 and 19 are attached as by bolts 76 and nuts 78 (bearing on metal shells 76' and 78') to opposite sides of a reduced outer peripheral portion 79 of the flange 75. The face members have thickened portions 80 and 81, respectively, at their outer peripheries so that fairly wide sealing surfaces are presented to the wall of the cylinder 12 to substantially prevent leakage or slip of fluid past the outer peripheral surface portions of the piston assembly 11.

In accordance with this invention, the tubular piston extensions 20 and 21 of the piston assembly 11 have their inner ends in sealed relation to the traveling nut member 17 as at threaded connections of the extensions with counterbored openings at opposite ends of the traveling nut member 17. Said sleeve extensions 20 and 21 are slidably received in the openings through the tubular extensions 41 and 42, respectively, of the heads 39 and 40, and function as sleeve type bushings to rotatably support the screw shaft 14 in cooperation with the bearing assembly 62.

The sleeve extension 20, which fits slidably into the annular space 74 defined by the packing support 47 and the reduced inner end portion 72 of the thrust shaft 69, has its outer surface operatively in engagement with the packing 50 to prevent fluid leakage from the left hand end of the cylinder 12.

Figure 3:
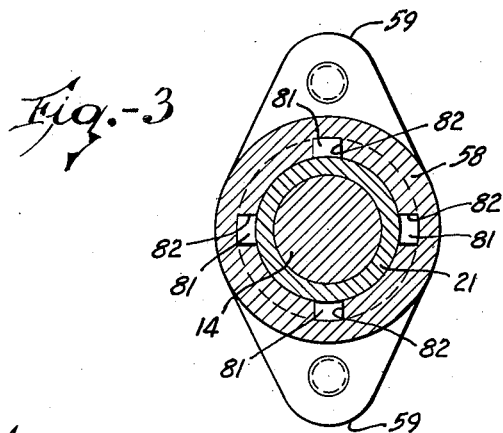
Fig. 3 is a sectional view taken generally at 3—3 in Fig. 2.

As shown most clearly in Fig. 3, the sleeve extension 21 has equally spaced and outwardly extending radial projections 81 at its outer end which are slidable in complementary longitudinal grooves 82 in the splined portion of the inner wall surface of the hollow axial bearing extension 58 and flanged end portion 59 of the associated housing member. By virtue of this spline type connection between the sleeve extension 21 and the bearing support 59, rotation of the piston assembly 11 is prevented. If desired set screws or locking pins (not shown) may be provided in an obvious manner to lock the piston hub portions 16 to the sleeve extensions 20 and 21 at the threaded connections of the hub portions 16 therewith. The outer surface of the sleeve extension 21 is operatively in engagement with the packing 53 and thereby fluid leakage from the right hand end of the cylinder 12 is prevented.

Assuming that the hydraulic fluid in the system is oil the main driving screw threads, bearing 62 and various sliding surfaces contact area between the sleeve extensions 20 and 21 and the adjacent parts described above can be lubricated by the almost negligible quantity of slip fluid which escapes from the main working cylinder past one or the other of the seals 50 and 53. Suitable pressure and suction relief channels or vents are, of course, provided, as in accordance with well known practice, for the generally closed spaces at the ends of the piston sleeve extensions 20 and 21 to prevent dead pocketing and oil locking on part of the piston extensions. Two vent holes are indicated at 48x and 58x respectively on Fig. 2.

From the foregoing it is apparent that as the screw shaft 14 reversibly rotates upon reversible operation of the motor M, or other reversible driving means, to thereby reciprocate the piston assembly 11, the sleeve extensions 20 and 21 slide freely back and forth in continuous engagement with the packings 50 and 53. The packings 50 and 53 consequently need only prevent fluid leakage between relatively sliding surfaces, and no packing is required between the rotating shaft 14 and the cylinder 12. The advantage of this arrangement is particularly important since it permits the thread portion 15 of the shaft 14 to pass through the cylinder head 40, thus making it possible to use a shorter cylinder 12 than otherwise would be required and also greatly simplifies the construction of the packing assemblies.

Figure 4:
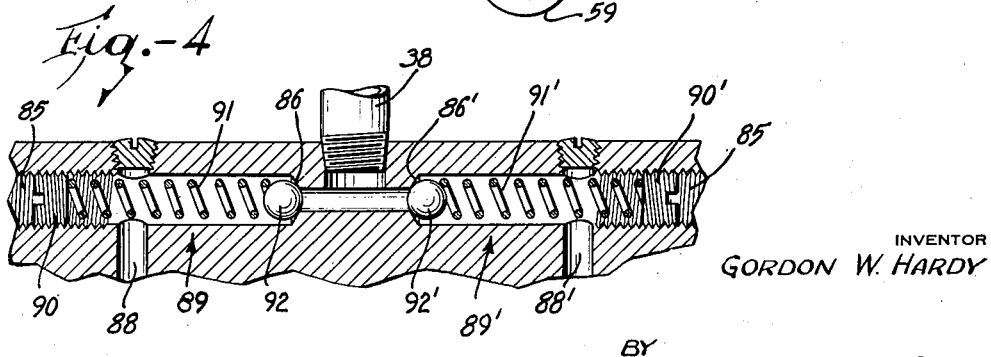
Fig. 4 is an enlarged schematic view (not in scale with Fig. 2) illustrating the means for controlling unidirectional fluid flow from a supply source to the actuator.

Referring now to Fig. 4 which shows most clearly the feature of this invention which insures a continuous replenishment of fluid to the system of which the actuator 10 of this invention forms a part without any possibility of the occurrence of "hydraulic backlash," a thickened wall portion 84 at the top of the cylinder 12 has an axial opening 85 therethrough which is counterbored from its opposite ends to define a pair of ball seats 86 and 86' on opposite sides of an intermediate intersecting opening 87 into which the conduit 35 (Fig. 1) is threaded. A pair of openings 88 and 88' extend transversely through the portion 84 and intersect the opening 85.

Valve assemblies 89 and 89' comprise a pair of screws 90 and 90' which are threaded into opposite ends of the opening 85 and hold in adjusted position a pair of valve springs 91 and 91', respectively, the thrust of which normally biases a pair of ball type valve plugs 92 and 92', respectively, against the seats 86 and 86'. The plugs of the valve assemblies 89 and 89' are held in closed position by the springs 91 and 91', respectively and the pressure of fluid in the cylinder 12 to prevent flow of fluid from the cylinder 12 to the source, but move to open position against the bias of the springs 91 and 91', respectively, by the hydraulic head of the source 37 and by suction created by movement of the piston 11 whenever additional fluid is required to completely fill the hydraulic system with fluid. A continuous supply of fluid for the system is thereby rendered available at all times, but "hydraulic backlash" and reduced efficiency is effectively prevented. The outer ends of the openings 85, 88, and 88' may be sealed by ordinary screw plugs 93. The plugs 93 which are aligned with the screws 90 and 90', when removed, enable said screws to be adjusted whereby to adjust and substantially equalize the seating force of the ball type valve plugs on their seats.

I claim:

1. In a hydraulic actuator, a cylinder, end caps secured on the ends of said cylinder, hollow axial bearing extensions screw threaded on said caps to provide a pair of aligned cylindrical internal bearing surfaces, a threaded shaft passing through said cylinder and into each of said aligned bearings and radially spaced therefrom, a piston with an axial opening in said cylinder, a tubular piston extension at each end of said piston, surrounding said shaft and extending into and journaled in respective hollow axial bearing extensions, an internal thread in said axial opening in said piston to engage thread on said shaft, and packing interposed between said caps and said hollow axial bearing extensions surrounding said tubular piston extensions at the ends of said pistons.

2. In a hydraulic actuator, a cylinder, end caps secured on the ends of said cylinder, hollow axial bearing extensions screw threaded on said caps to provide a pair of aligned cylindrical internal bearing surfaces, a threaded shaft passing through said cylinder and into each of said aligned bearings and radially spaced therefrom, a piston with an axial opening in said cylinder, a tubular piston extension at each end of said piston, surrounding said shaft and extending into and journaled in respective hollow axial bearing extensions, an internal thread in said axial opening in said piston to engage the thread on said shaft, and packing interposed between said caps and said hollow axial bearing extensions surounding said tubular piston extensions at the ends of said piston, means at each end of said cylinder to engage said shaft and receive the end thrust thereof as its rotation reciprocates said piston and means to adjust said first means to limit axial play between said shaft and said cylinder.

3. In a hydraulic actuator, a cylinder, end caps adapted to fit the ends of said cylinder and bolted thereto, a hollow axial bearing extension on each cap to provide a pair of aligned cylindrical internal bearing surfaces, a threaded shaft passing through said cylinder and into each of said aligned bearings and radially spaced therefrom, a piston with an axial opening in said cylinder, a tubular piston extension on each end of said piston, surrounding said shaft and extending into and journaled in respective hollow axial bearing extensions, annular fluid sealing members interposed between said hollow axial bearing extensions and said end caps and surrounding said tubular piston extensions remote from the interior of said cylinder and an internal thread in said axial opening in said piston to engage the thread on said shaft.

4. In a hydraulic actuator, a cylinder, end caps adapted to fit the ends of said cylinder and bolted thereto, a hollow axial bearing extension on each cap to provide a pair of aligned cylindrical internal bearing surfaces, a threaded shaft passing through said cylinder and into each of said aligned bearings and radially spaced therefrom, a piston with an axial opening in said cylinder, a tubular piston extension on each end of said piston, surrounding said shaft and extending into and journaled in respective hollow axial bearing extensions, annular fluid sealing members interposed between said hollow axial bearing extensions and said end caps and surrounding said tubular piston extensions remote from the interior of said cylinder and an internal thread in said axial opening in said piston to engage the thread on said shaft, means at each end of said cylinder to engage said shaft and receive end thrust thereof as its rotation reciprocates said piston.

5. In a hydraulic actuator, a cylinder, end caps adapted to fit the ends of said cylinder and bolted thereto, a hollow axial bearing extension on each cap to provide a pair of aligned cylindrical internal bearing surfaces, a threaded shaft passing through said cylinder and into each of said aligned bearings and radially spaced therefrom, a piston with an axial opening in said cylinder, a tubular piston extension on each end of said piston, surrounding said shaft and extending into and journaled in respective hollow axial bearing extensions, annular fluid sealing members interposed between said hollow axial bearing extensions and said end caps and surrounding said tubular piston extensions remote from the interior of said cylinder and an internal thread in said axial opening in said piston to engage the thread on said shaft, means at each end of said cylinder to engage said shaft and receive end thrust thereof as its rotation reciprocates said piston, second means to adjust said first means to limit axial play between said shaft and said cylinder.

GORDON W. HARDY.

REFERENCES CITED

The following references are of record in the file of this patent:

UNITED STATES PATENTS

| Number | Name | Date |
|---|---|---|
| 616,756 | Williamson | Dec. 27, 1898 |
| 1,457,156 | Frock | May 29, 1923 |
| 1,937,485 | Davis | Nov. 28, 1933 |
| 2,014,195 | McCollum | Sept. 10, 1935 |
| 2,204,649 | Barnhart | June 18, 1940 |
| 2,287,960 | Ballard | June 30, 1942 |
| 2,305,302 | Mazur | Dec. 15, 1942 |
| 2,334,383 | Carr | Nov. 16, 1943 |
| 2,344,473 | Stevenson | Mar. 14, 1944 |
| 2,360,539 | Ballard | Oct. 17, 1944 |